(12) United States Patent
Nishimura et al.

(10) Patent No.: US 11,076,088 B2
(45) Date of Patent: Jul. 27, 2021

(54) ARTIFICIAL INTELLIGENCE (AI)-BASED CONTROL OF IMAGING PARAMETERS OF IMAGE-CAPTURE APPARATUS

(71) Applicant: SONY CORPORATION, Tokyo (JP)

(72) Inventors: Hiroaki Nishimura, Paramus, NJ (US); Nikolaos Georgis, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 114 days.

(21) Appl. No.: 16/581,670

(22) Filed: Sep. 24, 2019

(65) Prior Publication Data

US 2021/0092280 A1    Mar. 25, 2021

(51) Int. Cl.
| | |
|---|---|
| H04N 5/76 | (2006.01) |
| H04N 5/232 | (2006.01) |
| G06K 9/62 | (2006.01) |
| G06N 3/08 | (2006.01) |
| G06N 3/04 | (2006.01) |

(52) U.S. Cl.
CPC ....... H04N 5/23218 (2018.08); G06K 9/6254 (2013.01); G06K 9/6256 (2013.01); G06K 9/6262 (2013.01); G06K 9/6277 (2013.01); G06N 3/04 (2013.01); G06N 3/08 (2013.01)

(58) Field of Classification Search
CPC ............. H04N 5/23218; G06K 9/6254; G06K 9/6256; G06K 9/6262; G06K 9/6277; G06N 3/04; G06N 3/08
USPC ...................................................... 348/231.6
See application file for complete search history.

(56) References Cited

U.S. PATENT DOCUMENTS

| | | | |
|---|---|---|---|
| 2016/0350645 A1* | 12/2016 | Brothers | G06N 3/04 |
| 2016/0364644 A1* | 12/2016 | Brothers | G06N 3/049 |
| 2019/0236411 A1* | 8/2019 | Zhu | G06K 9/6274 |

FOREIGN PATENT DOCUMENTS

| | | |
|---|---|---|
| CN | 108429878 A | 8/2018 |
| KR | 101935399 B1 | 1/2019 |

OTHER PUBLICATIONS

"5 Features of Honor 10's AI Camera", Honor, https://www.hihonor.com/global/blog/5-features-of-honor-10-ai-camera/, Oct. 24, 2018, 5 pages.

* cited by examiner

*Primary Examiner* — Usman A Khan
(74) *Attorney, Agent, or Firm* — Chip Law Group

(57) ABSTRACT

An image-capture apparatus and method for an artificial intelligence (AI) based control of imaging parameters of the image-capture apparatus is provided. The image-capture apparatus controls the imaging sensor based on a set of imaging parameters associated with the imaging sensor, to acquire imaging information. The acquired imaging information includes a first object of a plurality of objects. The image-capture apparatus generates by, a neural network model, a first classification result based on the acquired imaging information and modifies one or more first imaging parameters of the set of imaging parameters based on the generated first classification result for the first object. The image-capture apparatus further controls the imaging sensor based on the modified set of imaging parameters, to reacquire the imaging information to maximize a confidence of the neural network model for the detection of the first object in the reacquired imaging information.

20 Claims, 6 Drawing Sheets

ARTIFICIAL INTELLIGENCE (AI)-BASED CONTROL OF IMAGING PARAMETERS OF IMAGE-CAPTURE APPARATUS

CROSS-REFERENCE TO RELATED APPLICATIONS/INCORPORATION BY REFERENCE

None.

FIELD

Various embodiments of the disclosure relate to learning-based image processing, computer vision, and camera technologies. More specifically, various embodiments of the disclosure relate to an image-capture apparatus and method for artificial intelligence (AI) based control of imaging parameters of an image-capture apparatus.

BACKGROUND

Advancements in object detection technology have led to development of various imaging devices that detect objects in image frames. An imaging device can typically have many configurable options, some or all of which may be user configurable. These configurable options may have to be adjusted to set values of various imaging parameters which typically control accuracy of the object detection under different imaging conditions. Some of the imaging conditions may be, for example, a position of imaging device, distance between objects and the imaging device, typical speed of the objects to be detected, a weather-based lighting condition, and the like. Typically, users have no clear idea on how to adjust all the imaging parameters for better object detection and usually, there is a single optimal combination of imaging parameters that results in most reliable object detection.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-capture apparatus and method for artificial intelligence (AI)-based control of imaging parameters is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
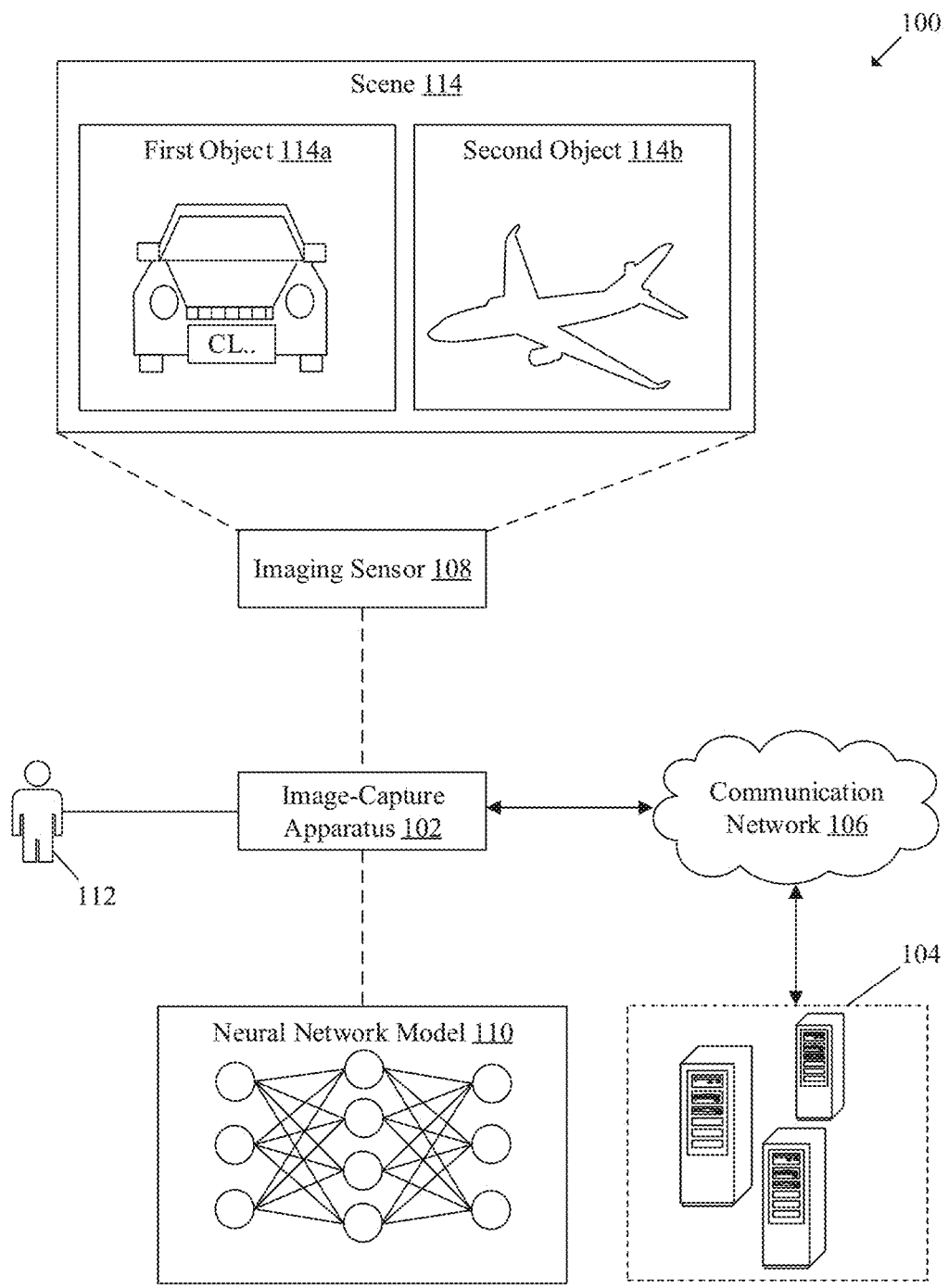
FIG. 1 is a diagram that illustrates an environment for an artificial intelligence (AI)-based control of imaging parameters of an image-capture apparatus, in accordance with an embodiment of the disclosure.

The following described implementations may be found in the disclosed image-capture apparatus and method for an artificial intelligence (AI) based control of imaging parameters of the image-capture apparatus. Exemplary aspects of the disclosure may include an image-capture apparatus (for example, a video camera). The image-capture apparatus includes an imaging sensor (for example, an active or a passive pixel sensor) and a memory which may be configured to store a neural network model. The neural network model may be trained to detect object(s) (for example a license plate, an airplane, a dog, etc.), which appear in the FoV of the imaging sensor and generate classification results for the detected object(s). These classification results may indicate a confidence of the neural network model for the detection of the object(s).

Typically, the confidence of the detection/recognition of object(s) in the acquired imaging information varies under different imaging conditions, for example, different lighting conditions. The confidence of the detection/recognition may also depend on an object type (e.g., license plate, aero plane, humans) and its behavior (e.g., articulate/non-articulate motion, color, and size) in an imaging environment. The disclosed image-capture apparatus may modify values of imaging parameters associated with the imaging sensor and control the imaging sensor based on modified values of imaging parameters, to acquire imaging information. Thereafter, it may be determined whether the confidence of the neural network model improves or degrades for the detection of certain object(s) of interest in the acquired imaging information. In case the confidence of the neural network model degrades, the imaging parameters may be further modified to counter the effect of the imaging condition(s) on the detection/recognition of the object(s) and new classification results for the detection of object(s) may be generated. The above process may be repeated iteratively until the confidence of the neural network model may exceed a threshold value (e.g., 60%). The aforementioned process helps users to avoid hassles of manually configuring the imaging parameters while deploying the image-capture apparatus to find a single optimal combination of imaging parameters that results in a most reliable object detection. This may be more helpful for users who have no clear idea on how to adjust all the imaging parameters for better object detection.

The disclosed image-capture apparatus may provide users with options to configure the image-capture apparatus 102 to detect object(s) of interest and to select a neural network model that is trained to detect/recognize the object(s) of interest. The user may be allowed to retrieve neural network parameters of an already trained neural network model from a repository of neural network models, available as downloadable files on servers.

In comparison to traditional cameras, the image-capture apparatus 102 may not use an image/video codec to encode/compress the imaging information acquired from the imaging sensor. Instead, the disclosed image-capture apparatus makes use of uncompressed (or lossless compressed) imaging information acquired directly from the imaging sensor. The uncompressed imaging information may be free from many image artifacts, especially compression artifacts and the neural network model may provide better detection/recognition results (in terms of the confidence) under different imaging conditions when the uncompressed imaging information is used to adjust the values of different imaging parameters. The use of the uncompressed imaging information may make the image-capture apparatus as power efficient and heat reductive as compared to traditional cameras.

FIG. 1 is a diagram that illustrates an environment for an artificial intelligence (AI)-based control of imaging parameters of an image-capture apparatus, in accordance with an embodiment of the disclosure. With reference to FIG. 1, there is shown a diagram of an environment 100. The environment 100 may include an image-capture apparatus 102, a server 104, and a communication network 106 established between the image-capture apparatus 102 and the server 104. The image-capture apparatus 102 may include an imaging sensor 108 and a neural network model 110. The neural network model 110 may be integrated with, for example, an image processing application on the image-capture apparatus 102. There is further shown a user 112, who may be associated with the image-capture apparatus 102.

The image-capture apparatus 102 may include suitable logic, circuitry, interfaces, and/or code that may be configured to control the imaging sensor 108 to acquire imaging information and generate, by the neural network model 110, classification result(s) for object(s) detected in the acquired imaging information. The imaging sensor 108 may be controlled based on a set of imaging parameters associated with the imaging sensor 108. The imaging information may be acquired from a scene, for example, a scene 114 that includes one of a first object 114a or a second object 114b in a field-of-view (FoV) of the imaging sensor 108. The image-capture apparatus 102 may modify one or more imaging parameters of the set of imaging parameters based on the generated classification results(s) and further control the imaging sensor 108 based on the modified set of imaging parameters, to reacquire the imaging information. This may be performed to maximize a confidence of the neural network model 110 for the detection of the object(s) in the reacquired imaging information.

The functionalities of the image-capture apparatus 102 may be implemented in portable devices, such as a high-speed computing device, or a camera, and/or non-portable devices, such as the server 104. Examples of the image-capture apparatus 102 may include, but are not limited to, a digital camera, a digital camcorder, a camera phone, a smart phone, a mobile device, a vehicle tracker device, a surveillance camera, a vehicle traffic monitoring device, a drone, a security device/camera, a computer workstation, a mainframe computer, a handheld computer, or any other computing device with a capability to capture images. In certain embodiments, the image-capture apparatus 102 may be a handheld video cam, a traffic camera, a closed-circuit television (CCTV) camera, a body camera (e.g. a police body camera), a dash camera (e.g., a dash camera on-board a police vehicle), or an in-vehicle camera.

The server 104 may include suitable logic, circuitry, and interfaces that may be configured to train the neural network model 110 on training datasets, which may include images and labels for desired object types. The server 104 may be configured to store the training dataset for the neural network model 110 and information related to various imaging parameters of imaging sensor 108. Examples of the server 104 may include, but are not limited to a database server, a file server, a web server, a cloud server, an application server, a mainframe server, or other types of server.

The communication network 106 may include a communication medium through which the image-capture apparatus 102 and the server 104 may communicate with each other. Examples of the communication network 106 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The imaging sensor 108 may include suitable logic, circuitry, interfaces, and/or code that may be configured to acquire imaging information of a scene in FoV of the imaging sensor 108. The acquired imaging information may include, for example, an uncompressed image frame of object(s) or a lossless compressed image frame of the object(s) in the scene. The imaging information may be acquired in at least one color, such as a Red, Green and Blue (RGB) color, Hue, Saturation and Brightness (HSB) color, Cyan Yellow Magenta and black (CYMK) color, or LAB color (in which L stands for Luminance and A and B are chromatic components). The imaging sensor 108 may have suitable optical instruments, such as lenses to focus on the scene and/or a particular object-of-interest (not shown) in the scene. Examples of implementation of the imaging sensor 108 may include, but are not limited to a semiconductor charged coupled device (CCD) based imaging sensor, a Complementary metal-oxide-semiconductor (CMOS) based imaging sensor, a backlit CMOS sensor with global shutter, a silicon-on-insulator (SOI)-based single-chip imaging sensor, an N-type metal-oxide-semiconductor based imaging sensor, a flat panel detector, or other imaging sensors.

The neural network model 110 may be referred to as a computational network or a system of artificial neurons, where each layer of the neural network model 110 may include artificial neurons as nodes. Outputs of all the nodes in the neural network model 110 may be coupled to at least one node of preceding or succeeding layer(s) of the neural network model 110. Similarly, inputs of all the nodes in the neural network model 110 may be coupled to at least one node of preceding or succeeding layer(s) of the neural network model 110. Node(s) in a final layer of the neural network model 110 may receive inputs from at least one previous layer. A number of layers and a number of nodes in each layer may be determined from a network topology and certain hyper-parameters of the neural network model 110. Such hyper-parameters may be set before or while training the neural network model 110 on a training dataset of image frames.

Each node in the neural network model 110 may correspond to a mathematical function with a set of parameters, tunable while the neural network model 110 is trained. These parameters may include, for example, a weight parameter, a regularization parameter, and the like. Each node may use the mathematical function to compute an output based on one or more inputs from nodes in other layer(s) (e.g., previous layer(s)) of the neural network model 110. Examples of the neural network model 110 may include, but are not limited to, a convolutional neural network (CNN), a fully convolutional neural network (FCN), a long-short term memory (LSTM)-CNN hybrid network, an auto-encoder, a variant thereof.

The neural network model 110 may include electronic data, such as, for example, a software program, code of the software program, libraries, applications, scripts, or other logic/instructions for execution by a processing device, such as the image-capture apparatus 102. Additionally, or alternatively, the neural network model 110 may be implemented using hardware, such as a processor, a microprocessor (e.g., to perform or control performance of one or more operations), a field-programmable gate array (FPGA), or an application-specific integrated circuit (ASIC). In some embodiments, the neural network model 110 may be implemented using a combination of both the hardware and the software program.

Once trained, the neural network model 110 may be configured to be deployed on the image-capture apparatus 102 and may be trained to detect object(s) of specific object types, for example, the first object 114a or the second object 114b. The neural network model 110 may be used as an object detector and may receive imaging information as input and may generate a plurality of classification results for object(s) detected in the imaging information. Each classification result may indicate a confidence (e.g., in terms of a probability score) of the neural network model 110 for a detection of an object in the imaging information.

In operation, the server 104 may include a repository of neural network models, where each neural network model 110 may be trained to detect/recognize object(s) of particular object type(s). Users of the image-capture apparatus 102 may be allowed to select an object detection task, for example, Automatic License-Plate Recognition (ALPR) and also select the neural network model 110 for the selected object detection task from the repository of neural network models. For example, a user who may want to use the image-capture apparatus 102 for the ALPR may be able to download, from the server 104, a neural network model trained on license plate images of vehicles. Such neural network model may be downloaded, for example, as a file that may include a set of neural network parameters of the neural network model 110. The set of neural network parameters may include, at least one a network topology, a set of neural weights, and/or a loss function. Also, in some cases, the set of neural network parameters may include activation functions (e.g., Rectified Linear Units) and convolution kernels to be used by the neural network model 110. Once downloaded, the user 112 may be provided with an option on the image-capture apparatus 102 to upload the file with the set of neural network parameters.

Herein, the network topology may determine a way in which the nodes of the neural network model 110 are interconnected with each other to form the neural network model 110. The network topology of the neural network model 110 may specify, for example, a number of layers, a number of neurons/nodes per layer and the interconnection structure between neurons in different layers of the neural network model 110. Some examples of network topology may include, but not limited to, an interlayer connection, an intralayer connection, a self-connection, a supra-layer connection. A neural weight may represent a strength of the connection between two neurons. If the weight from node "1" to node "2" has a greater magnitude, it may mean that node "1" has greater influence over node "2". The neural weight may decide how much influence the input to the neural network model 110 will have on the output of the neural network model 110.

The image-capture apparatus 102 may deploy the neural network model 110 on the image-capture apparatus 102, for example, as part of or as an integration for an image processing application that may be configured for an object detection/recognition task (e.g., ALPR). The neural network model 110 may be deployed for detection/recognition of a plurality of objects, for example, aero planes or license plate numbers of vehicles. The image-capture apparatus 102 may control the imaging sensor 108 to acquire imaging information of a scene in the FoV of the imaging sensor 108. The imaging information may be, for example, uncompressed (or raw) images or images which may be encoded with a lossless or a lossy codec. In certain embodiments, a portion of the imaging information may be acquired from remote cameras (e.g., CCTV cameras) installed in different locations.

The imaging sensor 108 may be controlled based on a set of imaging parameters associated with the imaging sensor 108, in order to acquire the imaging information. By way of example, initial values of one or more imaging parameters of the set of imaging parameters may be set by the image-capture apparatus 102, while values of other imaging parameters may remain same as default values. Examples of the set of imaging parameters may include, but are not limited to, a focus parameter, an f-stop parameter, an exposure parameter, a shutter speed parameter, an aperture parameter, a gain parameter, a backlight parameter, a brightness parameter, a contrast parameter, a sharpness parameter, a white balance parameter, a sharpness parameter, a ISO sensitivity parameter, a noise reduction parameter, a demosaic parameter, a denoise parameter, a color parameter, a high dynamic range (HDR) parameter, or a deblur parameter.

The image-capture apparatus 102 may generate, by the neural network model 110, a first classification result for a first object included in the imaging information, based on the acquired imaging information. For example, the acquired imaging information may be provided as an input to the neural network model 110. Thereafter, the neural network model 110 may process the acquired imaging information to detect the first object in the acquired imaging information and generate the first classification result for the first object. The generated first classification result may indicate a confidence of the neural network model 110 for the detection of the first object in the acquired imaging information, and more specifically. the first classification result may include a probability score that may indicate the confidence of the detection of the first object by the neural network model 110.

Typically, the confidence of detection/recognition of object(s) from the acquired imaging information varies under different imaging conditions, for example, different lighting conditions, conditions related to object size, object speed, distance between the object and the image-capture apparatus 102, a presence of occluding structures/objects, and the like. The confidence of the detection/recognition may also depend on an object type (e.g., license plate, aero plane, humans) and its behavior (e.g., articulate/non-articulate motion, color, and size with respect to the image-plane of the image-capture apparatus 102) in an imaging environment where the image-capture apparatus 102 is to be deployed. For example, a camera for the ALPR application may be deployed such that the FoV of the traffic camera covers a section of road with a likelihood of acquiring license plate images of vehicles on the section of the road. For the ALPR application, the traffic camera may need to operate in both bright lighting condition at daytime as well as low light condition at nighttime. In every condition, the accuracy or the confidence for the detection/recognition of the object(s) in the FoV may depend on values of certain imaging parameters associated with the imaging sensor 108. In order to find values of the imaging parameters that maximize the confidence of the neural network model 110 for the object detection/recognition, the image-capture apparatus 102 may execute certain operations, as described herein.

The image-capture apparatus 102 may modify one or more first imaging parameters of the set of imaging parameters based on the generated first classification result for the first object in the acquired imaging information. For example, in case of ALPR application, the shutter speed/exposure for the imaging sensor 108 may need to be decreased at night-time to increase exposure time of the imaging sensor 108 to more light signals. Based on the modified set of imaging parameters, the image-capture apparatus 102 may further control the imaging sensor 108 to reacquire the imaging information to maximize the confidence of the neural network model 110 for the detection of the first object in the reacquired imaging information. For example, the image-capture apparatus 102 may generate a second classification result by the application of the neural network model 110 on the reacquired imaging information. The image-capture apparatus 102 may compare the second classification result with the first classification result. Based on the comparison of the second classification result with the first classification result, it may be determined whether the confidence of the neural network model 110 for the detection/recognition of the first object in the reacquired imaging information exceeds a threshold value.

In cases where the confidence of the neural network model 110 exceeds the threshold value (e.g., ~60% or ~0.6/1), the image-capture apparatus 102 may generate a first combination of values of imaging parameters for the imaging sensor 108 based on the modified set of imaging parameters. The first combination of values of imaging parameters may be generated for the maximization of the confidence of the neural network model 110 for the detection of the first object. The image-capture apparatus 102 may store the generated first combination of values of imaging parameters for the first object in memory. Such combination of values may be stored so that it may be later reused to further control the imaging sensor 108 to acquire new imaging information which is optimal for object detection/recognition performance.

In cases where the confidence of the neural network model 110 decreases or increases but stays below the threshold value, the image-capture apparatus 102 may repeat abovementioned operations related to modification of imaging parameters and reacquisition of the imaging information based on the modified imaging parameters. These operations may be repeated until the confidence of the neural network model 110 exceeds the threshold value.

In some embodiments, the image-capture apparatus 102 may receive a user input for a selection of a second object, which may be associated with a different object type, for example. The image-capture apparatus 102 may generate a second combination of values of imaging parameters for the imaging sensor 108 to maximize a classification result for the second object in the acquired imaging information. The image-capture apparatus 102 may store the generated second combination of values of imaging parameters for the second object in the memory. In this way, the user 112 may be provided a functionality to modify a previous object detection task with a focus on object(s) of a different object type/specification.

Figure 2:
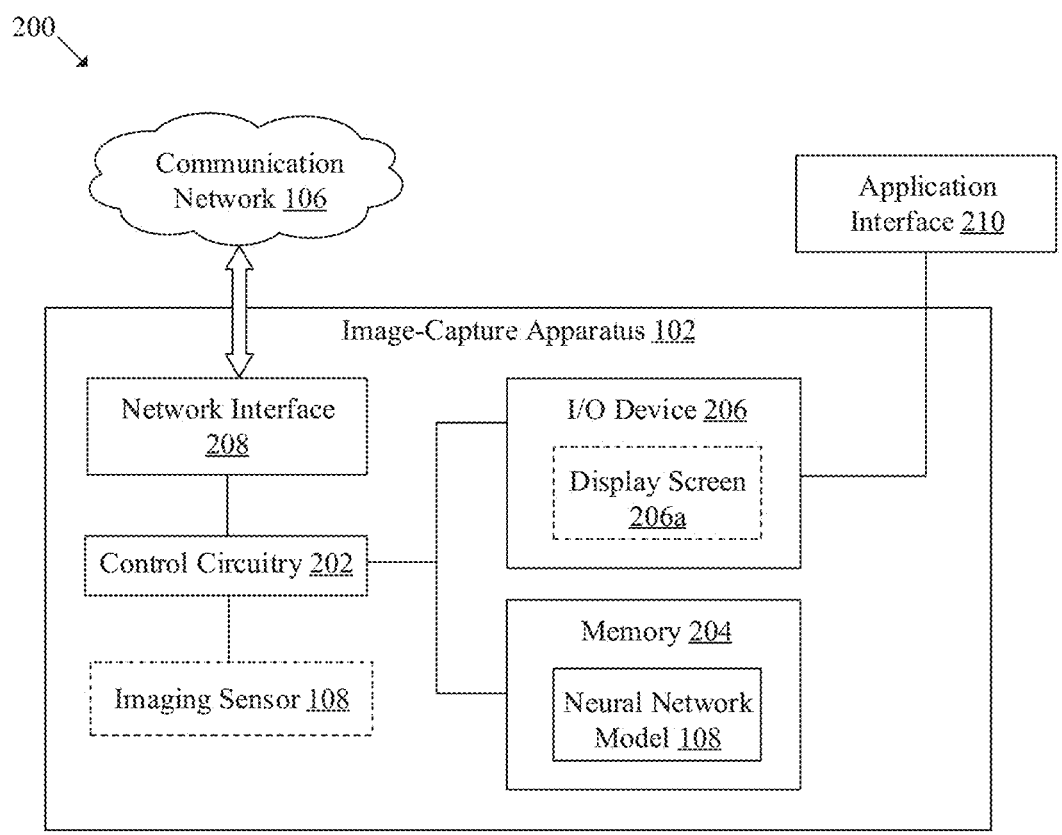
FIG. 2 is an exemplary block diagram of the image-capture apparatus of FIG. 1, in accordance with an embodiment of the disclosure.

FIG. 2 is an exemplary block diagram of the image-capture apparatus of FIG. 1, in accordance with an embodiment of the disclosure. FIG. 2 is explained in conjunction with elements from FIG. 1. With reference to FIG. 2, there is shown a block diagram 200 of the image-capture apparatus 102. The image-capture apparatus 102 may include control circuitry 202, a memory 204, an input/output (I/O) device 206, a network interface 208, and an application interface 210. The control circuitry 202 may be communicatively coupled to the memory 204, the I/O device 206, the network interface 208, and the application interface 210. In at least one embodiment, the image-capture apparatus 102 may include provisions to capture images/videos via the imaging sensor 108 and to allow the user to view the captured images/videos and/or apply certain operations on the captured images/videos.

The control circuitry 202 may include suitable logic, circuitry, interfaces, and/or code that may be configured to execute a set of operations to maximize a confidence of the neural network model 110 for the detection of the object(s) in the imaging information acquired by the imaging sensor 108. The control circuitry 202 may be implemented based on a number of processor technologies known in the art. Examples of implementations of the control circuitry 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or a combination thereof.

The memory 204 may include suitable logic, circuitry, and/or interfaces that may be configured to store instructions executable by the control circuitry 202. In addition, the memory 204 may store the neural network model 110 and the set of imaging parameters associated with the imaging sensor 108 for each object of the plurality of objects. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O channel/interface between the user 112 and the image-capture apparatus 102. The I/O device 206 may include various input and output devices, which may be configured to communicate with different operational components of the image-capture apparatus 102. Examples of the I/O device 206 may include, but are not limited to, a touch screen, a keyboard, a mouse, a joystick, a microphone, and a display screen (for example, a display screen 206a).

The display screen 206a may include suitable logic, circuitry, and interfaces that may be configured to display the application interface 210. The display screen 206a may be a touch screen which may enable the user 112 to provide a user input via the display screen 206a. The display screen 206a may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206a may refer to a display screen of a head mounted device (HMD), a smart-glass device, a see-through display, a projection-based display, an electro-chromic display, or a transparent display.

The network interface 208 may include suitable logic, circuitry, interfaces, and/or code that may be configured to connect and communicate with a plurality of electronic devices, such as a computer, a smartphone, or the server 104. The network interface 208 may be configured to implement known technologies to support wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured as a medium for the user 112 to interact with the image-capture apparatus 102. The application interface 210 may a dynamic interface that may change according to the preferences set by the user 112 and configuration of the image-capture apparatus 102. In some embodiments, the application interface 210 may correspond to a user interface of one or more applications installed on the image-capture apparatus 102. The functions or operations executed by the image-capture apparatus 102, as described in FIG. 1, may be performed by the control circuitry 202. The operations of the control circuitry 202 are described in detail, for example, in FIGS. 3, 4, and 5.

Figure 3:
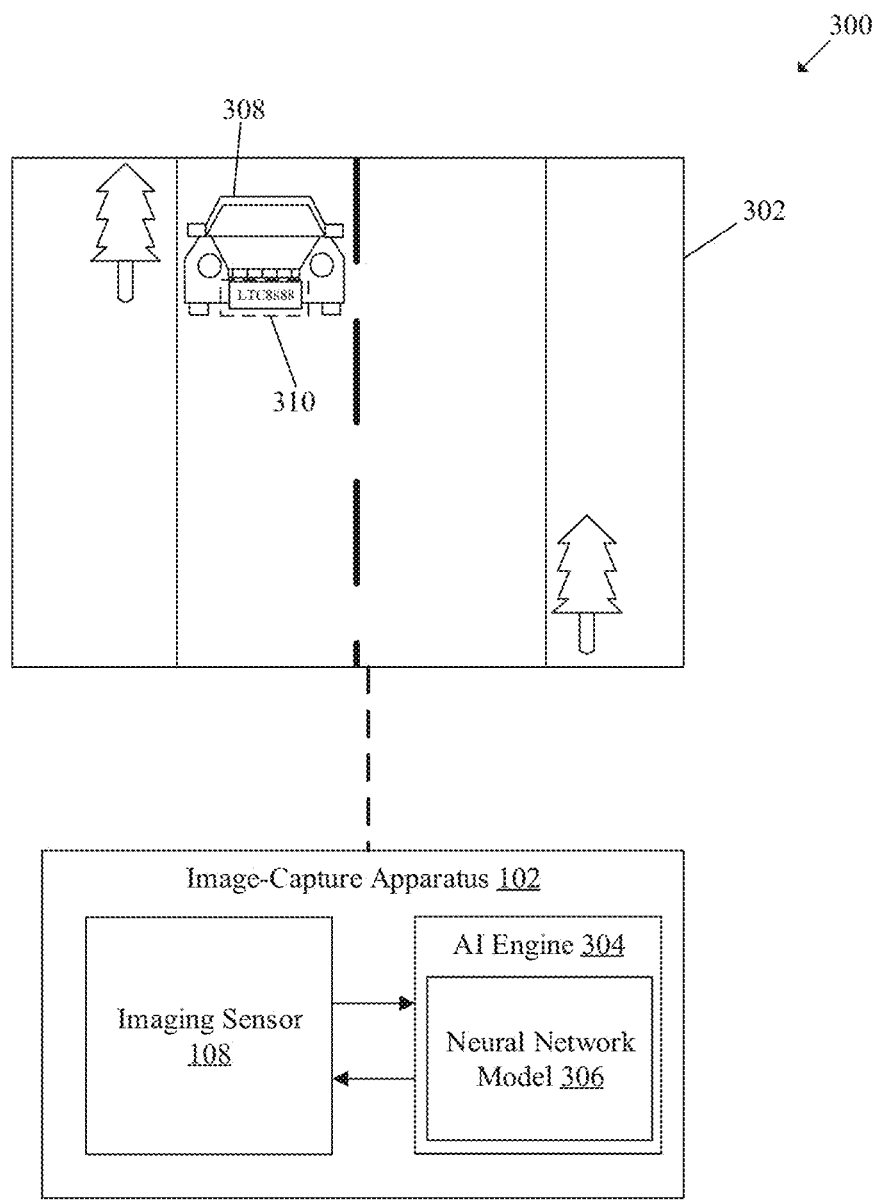
FIG. 3 is a diagram that illustrates an exemplary scenario for an AI-based control of imaging parameters of an image-capture apparatus, in accordance with an embodiment of the disclosure.

FIG. 3 is a diagram that illustrates an exemplary scenario for an AI-based control of imaging parameters of an image-capture apparatus, in accordance with an embodiment of the disclosure. FIG. 3 is explained in conjunction with elements from FIG. 1 and FIG. 2. With reference to FIG. 3, there is shown a scenario diagram 300. In the scenario diagram 300, there is shown the image-capture apparatus 102 and a scene 302 in a FoV of the image-capture apparatus 102. The image-capture apparatus 102 includes the imaging sensor 108 and an Artificial Intelligence (AI) engine 304. The AI engine 304 may be a software application, for example, an ALPR software and may be configured to include a neural network model as part of the software application.

In at least one embodiment, the image-capture apparatus 102 may need to be configured for an object detection/recognition task and therefore, may enter into a preview mode. In the preview mode, a preview of the scene 302 may be displayed on a display screen. The display screen may be the display screen 206a of the image-capture apparatus 102 or an external display (e.g., in a traffic control room) communicatively coupled to the image-capture apparatus 102.

The user 112 may be allowed to select an object or an object type, for example, with a touch-input on the preview of the scene 302. Once a selection is made, the image-capture apparatus 102 may determine an object type/object class based on the selection and set the object detection/recognition task based on the determined object type/object class. For example, if the scene 302 includes trees, roads, and vehicles with license plates, a selection of the vehicle may result in a prompt that verifies the object type as a vehicle. Also, the user 112 may request or provide further input to set ALPR of vehicles as the object detection/recognition task. Based on the determined object type/object class, the user 112 may be prompted to upload a set of neural network parameters, as part of a neural network model. The set of neural network parameters may include, for example, a network topology parameter, a set of neural weights, and/or a loss function. In some embodiments, the set of neural network parameters may be available as a downloadable file, which may be part of a repository of neural network models pretrained on the server 104 for different object types/object classes. The user 112 may just have to operate the image-capture apparatus 102 to browse an application interface that shows all the downloadable files for the repository of neural network models. The image-capture apparatus 102 may receive a user input for the selection of a file that includes the set of neural network parameters of a neural network model 306 that is trained on images of the determined object type/object class. Once selected, the set of neural network parameters of the file may be deployed as the neural network model 306 on the image-capture apparatus 102.

The image-capture apparatus 102 may control the imaging sensor 108 based on a set of imaging parameters associated with the imaging sensor 108, to acquire imaging information of the scene 302. The acquired imaging information may include a first object 308, which may be an object-of-interest for an object detection/recognition task. The set of imaging parameters may include, but are not limited to, a focus parameter, an exposure parameter, a shutter speed parameter, an aperture parameter, f-stop parameter, a gain parameter, a backlight parameter, a brightness parameter, a contrast parameter, a sharpness parameter, a white balance parameter, a sharpness parameter, a ISO sensitivity parameter, a noise reduction parameter, a demosaic parameter, a denoise parameter, a color parameter, a high dynamic range (HDR) parameter, or a deblur parameter. A modification of at least one imaging parameter may result in a change in a visual quality of the acquired imaging information.

The image-capture apparatus 102 may generate, by the neural network model 306, a first classification result for the first object 308 based on the acquired imaging information. For example, the neural network model 306 may receive the acquired imaging information (e.g., uncompressed image frames) as an input and may generate the first classification result as a soft-max classification for the first object 308 based on the input. The generated first classification result may indicate a confidence of the neural network model 306 for the detection of the first object 308 in the acquired imaging information. Specifically, the first classification result may include a probability score that indicates the confidence of the detection of the first object 308 by the neural network model 306. The image-capture apparatus 102 may store the generated first classification result in the memory 204 of the image-capture apparatus 102.

In some embodiments, the image-capture apparatus 102 may extract a region-of-interest 310 from the acquired imaging information. The extracted region-of-interest 310 may include at least a portion of the first object 308. For example, in case of ALPR, the region-of-interest 310 may include a license plate of a vehicle. In such a case, the first classification result for the first object 308 may be generated based on the extracted region-of-interest 310.

Typically, the confidence of detection/recognition of object(s) from the acquired imaging information varies under different imaging conditions, for example, different lighting conditions, conditions related to object size, object speed, distance between the object and the image-capture apparatus 102, a presence of occluding structures/objects, and the like. The confidence of the detection/recognition may also depend on an object type (e.g., license plate, aero plane, humans) and its behavior (e.g., articulate/non-articulate motion, color, and size with respect to the image-plane of the image-capture apparatus 102) in an imaging environment where the image-capture apparatus 102 is deployed.

For example, a traffic camera for the ALPR application may be deployed such that the FoV of the traffic camera covers a section of road with a likelihood of acquiring license plate images of vehicles on the section of road. With such application, the traffic camera may need to operate in both bright lighting condition at daytime as well as low light condition at nighttime. In every condition, the accuracy or the confidence for the detection/recognition of the object(s) in the FoV may depend on values of certain imaging parameters associated with the image sensor. In order to find values of the imaging parameters that maximize the confidence of the neural network model 306 for the object detection/recognition, the image-capture apparatus 102 may execute certain operations, as described herein.

The image-capture apparatus 102 may modify one or more first imaging parameters of the set of imaging parameters based on the generated first classification result for the first object 308. The image-capture apparatus 102 may have an integrated linear and non-linear optimizer to modify the one or more first imaging parameters of the set of imaging parameters. The one or more first imaging parameters may be modified to counter the effect of imaging condition(s) that may lead to the first classification result. For example, in case of the ALPR application, the first classification result for a license plate (as the first object 308) at day-time may indicate a high confidence (e.g., 50%) that exceeds a threshold value (e.g., 40%); however, the first classification result for the license plate at night-time may indicate a low confidence (e.g., 33%). The image-capture apparatus 102 may determine the low lighting condition as a primary condition that may have led to the low confidence and therefore, may modify the shutter speed or the exposure time of the imaging sensor 108 to improve the low confidence of the detection/recognition.

In at least one embodiment, the image-capture apparatus 102 may compare the generated first classification result for the first object 308 with a previous classification result generated by the neural network model 306 for the first object 308. Based on the comparison, the image-capture apparatus 102 may modify one or more second imaging parameters of the set of imaging parameters. The one or more second imaging parameters may be different from the one or more first imaging parameters. Specifically, the image-capture apparatus 102 may modify the one or more second imaging parameters of the set of imaging parameters based on a determination that the confidence indicated by the generated first classification result is less than that by the previous classification result.

For example, for the first classification result, the imaging information may have been acquired with a focus parameter set by default at the center of an FoV region of the image-capture apparatus 102. However, the first object 308 may be left shifted from the center of the FoV region and therefore, may appear out-of-focus. As a result, the first classification result may indicate a lower confidence of the neural network model 306 in the detection/recognition of the first object 308, as compared to that for a previous classification result. The image-capture apparatus 102 may attempt to reacquire the imaging information based on a modification of the focus parameter by left shifting a focus point of the image-capture apparatus 102 from the center of the FoV region.

The image-capture apparatus 102 may control the imaging sensor 108 based on the modified one or more first imaging parameters, to reacquire the imaging information. Once the imaging information is reacquired, the image-capture apparatus 102 may generate, by the neural network model 306, a second classification result based on the reacquired imaging information. Thereafter, the image-capture apparatus 102 may compare the generated first classification result for the first object 308 with the generated second classification result for the first object 308. Based on the comparison of the second classification result with the first classification result, it may be determined whether the confidence of the neural network model 306 for the detection/recognition of the first object 308 in the reacquired imaging information exceeds a threshold value.

In cases where the confidence of the neural network model 306 exceeds the threshold value (e.g., ~60% or ~0.6/1), the image-capture apparatus 102 may generate a first combination of values of imaging parameters for the imaging sensor 108 based on the modified set of imaging parameters. The first combination of values of imaging parameters may be generated for the maximization of the confidence of the neural network model 306 for the detection of the first object 308. The image-capture apparatus 102 may control the memory to store the generated first combination of values of imaging parameters for the first object 308 so that the such combination of values may be reused later to control the imaging sensor 108 to acquire imaging information for optimal object detection/recognition performance.

In cases where the confidence of the neural network model 306 decreases or increases but stays below the threshold value, the image-capture apparatus 102 may repeat abovementioned operations related to modification of imaging parameters and reacquisition of the imaging information based on the modified imaging parameters. These operations may be repeated until the confidence of the neural network model 306 exceeds the threshold value.

In some embodiments, the image-capture apparatus 102 may include a plurality of imaging sensors. Each imaging sensor 108 of the plurality of imaging sensors may be configured to detect the first object 308. The image-capture apparatus 102 may generate a first combination of values for one imaging sensor 108 and may share the generated first combination of values with other imaging sensors of the plurality of sensors. Other imaging sensors may receive the generated first combination of values and may modify their respective imaging parameters based on the received first combination of values. In some embodiments, the server 104 may generate the first combination of values and further share the first combination of values with each imaging sensor of the plurality of imaging sensors.

In some embodiments, the image-capture apparatus 102 may display the detected first object 308 on a display screen. The display screen may be the display screen 206a of the image-capture apparatus 102 or an external display (e.g., in a traffic control room) communicatively coupled to the image-capture apparatus 102. Additionally, or alternatively, the image-capture apparatus 102 may display supplemental information on the display screen. For example, for the ALPR application, the supplemental information may include an image sample based on which the license plate may have been detected/recognized. The image sample may include a license plate image of the license plate and may be overlaid with a bounding box around each individual character (e.g., L, T, C, 8, 8, 8, 8) of the license plate number on the license plate. Additionally, the image sample be overlaid with a confidence value of the detection/recognition of the license plate number and detected characters of the license plate number.

In some embodiments, the image-capture apparatus 102 may extract a region-of-interest 310 from the reacquired imaging information and display the extracted region-of-interest 310 via the display screen 206a. In some embodiments, the extracted region-of-interest 310 may include at least a portion of the detected first object 308 (for example, a license plate of the car). The image-capture apparatus 102 may share the extracted region-of-interest 310 with a user device (e.g., a traffic control room for ALPR application) via the communication network 106.

Although, the neural network model 306 may be already trained on the server 104, exemplary embodiments are described herein for online training of the neural network model 306 on the image-capture apparatus 102 or on the server 104. In one embodiment, the image-capture apparatus 102 may receive a first user input corresponding to a selection of the first object 308 in the acquired imaging information displayed on a display screen. The display screen may either the display screen 206a of the image-capture apparatus 102 or an external display communicatively coupled to the image-capture apparatus 102.

The first user input may be received through one of an application interface, gaze detection, hand gesture detection, or a touch input. In certain cases, the user 112 may also specify, via the first user input, a type (for example, a license plate number) of the first object 308 (e.g., a license plate of a vehicle) to be detected. The first user input may be a user request to train the neural network model 306 on the imaging information acquired by the imaging sensor 108. The image-capture apparatus 102 may update the neural network model 306 based on training of the neural network model 306 on the acquired imaging information. In training, a set of neural weights of the neural network model 306 may be updated based on an output of the neural network model 306 for the detection of the first object 308 in the acquired imaging information.

In another embodiment, the image-capture apparatus 102 may transmit a request to train the neural network model 306 to the server 104 based on the received first user input. Along with the request, the image-capture apparatus 102 may also share the acquired imaging information with the server 104. The server 104 may receive the request and the acquired imaging information as training data. Thereafter, the server 104 may train the neural network model 306 on the acquired imaging information so that the neural network model 306 may robustly detect the first object 308.

In another embodiment, the image-capture apparatus 102 may receive a second user input for a selection of a second object in the acquired imaging information. The image-capture apparatus 102 may generate a second combination of values of imaging parameters for the imaging sensor 108 to maximize the confidence of the neural network model 306 for the detection of the second object. The image-capture apparatus 102 may control the memory to store the generated second combination of values of imaging parameters for the second object.

Figure 4:
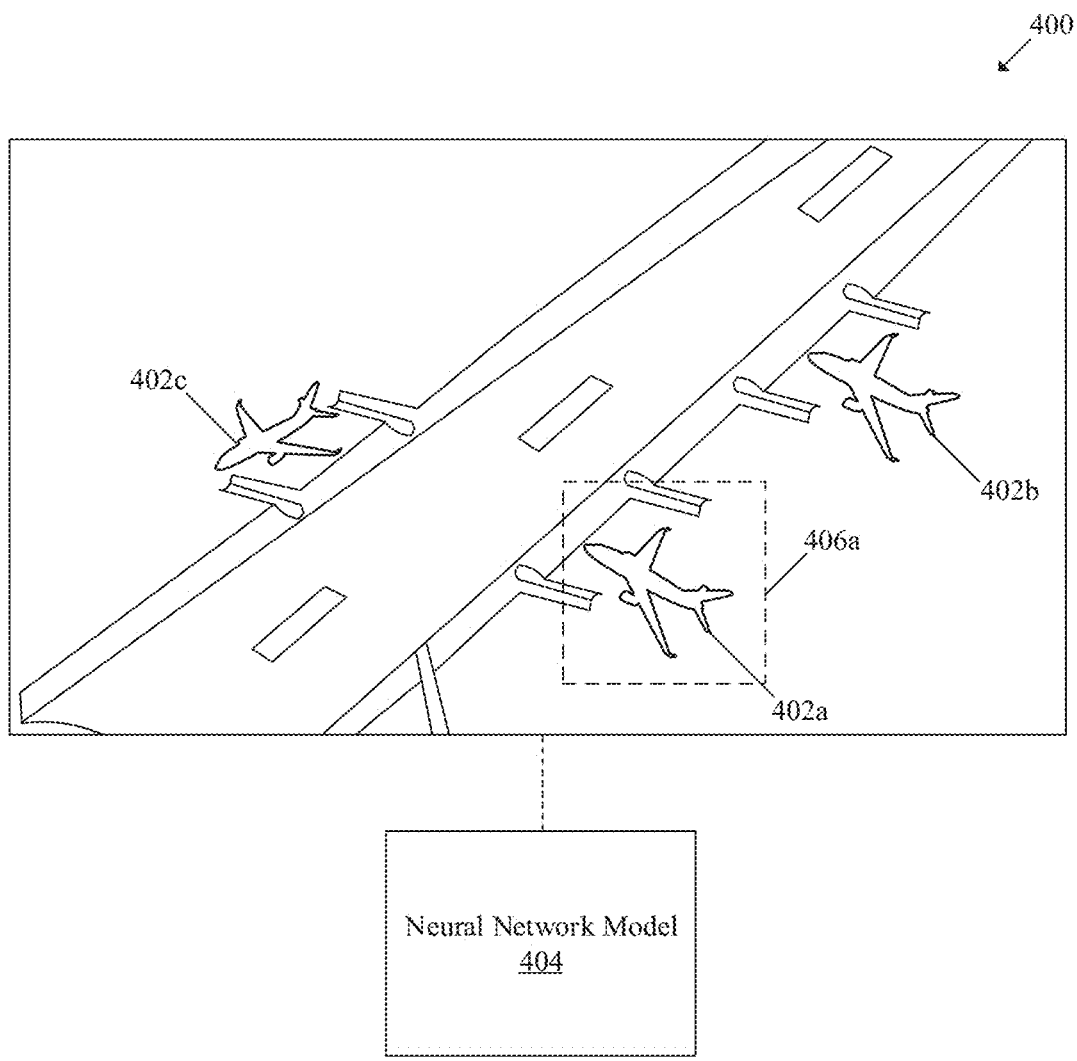
FIG. 4 is a diagram that illustrates exemplary imaging information generated by an imaging sensor of the image-capture apparatus of FIG. 2, in accordance with an embodiment of the disclosure.

FIG. 4 is a diagram that illustrates exemplary imaging information generated by an imaging sensor of the image-capture apparatus of FIG. 2, in accordance with an embodiment of the disclosure. FIG. 4 is explained in conjunction with elements from FIG. 1, FIG. 2, and FIG. 3. With reference to FIG. 4, there is shown imaging information 400 and a plurality of aero planes (airplanes) 402a, 402b, and 402c as a plurality of objects in the imaging information 400. The plurality of aero planes 402a, 402b, and 402c may include a first aero plane 402a, a second aero plane 402b and a third aero plane 402c. The imaging information 400 may be acquired by the imaging sensor 108 of the image-capture apparatus 102, while the image-capture apparatus 102 may be deployed in an installation environment specific for Air Traffic Management (ATM).

The image-capture apparatus 102 may select a neural network model 404 trained for aero plane detection task based on a user input. Based on the selection of the neural network model 404, the image-capture apparatus 102 may retrieve, from the server 104, a file that include a set of neural network parameters of the neural network model 404. Once retrieved, the image-capture apparatus 102 may store the file as the neural network model 404 in the memory 204. The neural network model 404 may be trained for the aero plane detection task, i.e. to detect the plurality of aero planes 402a, 402b, and 402c and generate a plurality of classification results for the detection of the plurality of aero planes 402a, 402b, and 402c. Each classification result may correspond to a probability score that indicates a confidence of the neural network model 404 in the detection of a respective aero plane of the plurality of aero plane.

The image-capture apparatus 102 may extract a first region-of-interest 406a from the acquired imaging information 400. The first region-of-interest 406a may include the first aero plane 402a. The image-capture apparatus 102 may generate, by the neural network model 404, a first classification result based on the extracted first region-of-interest 406a from the acquired imaging information. The first classification result may be for the first aero plane 402a and may indicate a confidence of the neural network model 404 for the detection of the first aero plane 402a in the acquired imaging information.

At any time, imaging conditions in the installation environment may change. For example, a change from sunny weather to rainy weather may result in a low lighting condition and therefore, the first aero plane 402a in the acquired imaging information may be underexposed to light. As a result, the first classification result for the first aero plane 402a may indicate a lower confidence for the detection of the first aero plane 402a as compared to that when the imaging sensor 108 is exposed under normal lighting conditions.

The image-capture apparatus 102 may modify one or more first imaging parameters of the set of imaging parameters based on the generated first classification result for the first aero plane 402a. The process of modification of the one or more first imaging parameters is described in detail, for example, in FIG. 3. The image-capture apparatus 102 may further control the imaging sensor 108 based on the modified set of imaging parameters, to reacquire the imaging information. This may be performed to maximize the confidence of the neural network model 404 for the detection of the first aero plane 402a in the reacquired imaging information.

Figure 5:
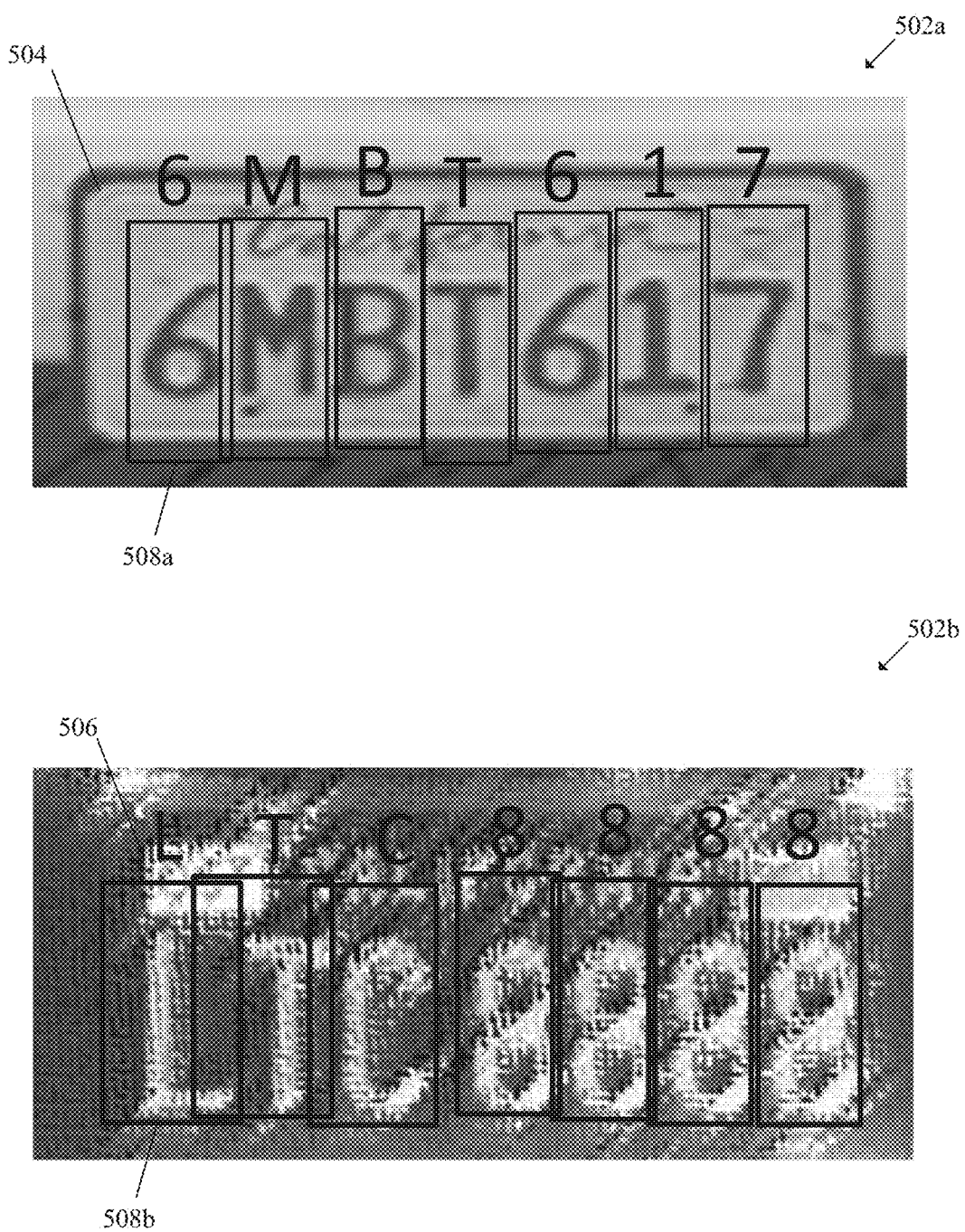
FIG. 5 is a diagram that illustrates an exemplary scenario for license plate recognition (LPR) under different imaging conditions, in accordance with an embodiment of the disclosure.

FIG. 5 illustrates an exemplary scenario for license plate recognition (LPR) under different imaging conditions, in accordance with an embodiment of the disclosure. FIG. 5 is explained in conjunction with elements from FIGS. 1, 2, 3, and 4. With reference to FIG. 5, there is shown an image sample 502a of a license plate 504 at a first time-instant (to) and an image sample 502b of a license plate 506 at a second time instant (ti). The image sample 502a may be captured at day-time and the image sample 502b may be captured at night-time. As a result, the image sample 502b may be underexposed to light, as shown in FIG. 5.

An experimental result to show a variation in a confidence of the neural network model 110 on LPR with a change in shutter speed of the imaging sensor 108, is provided in Table 1, as follows.

TABLE 1

LPR confidence vs Shutter Speed of the imaging sensor 108

| $\frac{1}{\text{Shutter Speed}}$ | LPR Confidence |
|---|---|
| 1 | 0.480 |
| 10 | 0.474 |
| 25 | 0.468 |
| 30 | 0.456 |
| 50 | 0.465 |
| 60 | 0.453 |
| 100 | 0.484 |
| 200 | 0.456 |
| 480 | 0.348 |
| 960 | 0.150 |
| 3000 | 0.000 |

It should be noted here that data provided in Table 1 should be merely be taken as experimental data and should not be construed as limiting for the present disclosure. As shown in Table 1, changes in the shutter speed expose the imaging sensor 108 with different amounts of light. The LPR confidence of the neural network model 110 improves as the shutter speed decreases (or exposure time increases) at night-time to avoid acquisition of images samples that are underexposed under low light conditions. It should be noted that the exposure time or the shutter speed is one of the imaging parameters which may need to be modified by the image-capture apparatus 102 to maximize a confidence in the detection of objects, such as license plates.

In FIG. 5, there is shown a first set of bounding boxes 508a and a second set of bounding boxes 508b on the image sample 502a and the image sample 502b, respectively. The first set of bounding boxes 508a may localize all the characters (6, M, B, T, 6, 1, 7) imprinted on the license plate 504. Similarly, the second set of bounding boxes 508b may localize all the characters (L, T, C, 8, 8, 8, and 8) imprinted on the license plate 506.

Figure 6:
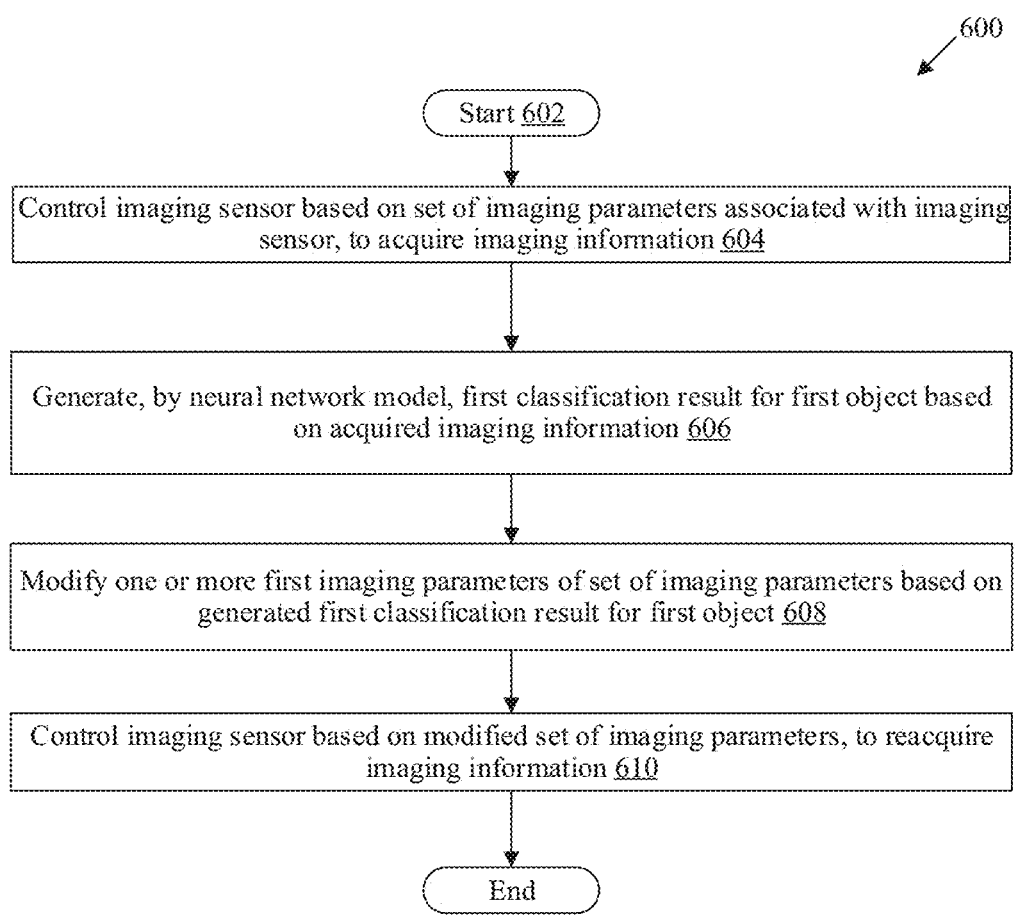
FIG. 6 is a flowchart that illustrates an exemplary method for an AI-based control of imaging parameters of an image-capture apparatus, in accordance with an embodiment of the disclosure.

FIG. 6 is a flowchart that illustrates an exemplary method for an AI-based control of imaging parameters of an image-capture apparatus, in accordance with an embodiment of the disclosure. With reference to FIG. 6, there is shown a flowchart 600. The operations of the exemplary method may be executed by any image-capture apparatus, for example, by the image-capture apparatus 102 of FIG. 2. The operations of the flowchart 600 may start at 602 and proceed to 604.

At 604, the imaging sensor 108 may be controlled based on a set of imaging parameters associated with the imaging sensor 108, to acquire imaging information. The acquired imaging information may include a first object. In at least one embodiment, the control circuitry 202 may control the imaging sensor 108 based on the set of imaging parameters, to acquire the imaging information.

At 606, a first classification result for the first object may be generated by the neural network model 110 based on the acquired imaging information. In at least one embodiment, the control circuitry 202 may generate, by the neural network model 110, the first classification result for the first object based on the acquired imaging information.

At 608, one or more first imaging parameters of set of imaging parameters may be modified. The one or more parameters may be modified based on generated first classification result for the first object in the acquired imaging information. In at least one embodiment, the control circuitry 202 may modify one or more first imaging parameters of set of imaging parameters based on generated first classification result for first object.

At 610, the imaging sensor 108 may be further controlled based on modified set of imaging parameters, to reacquire the imaging information. The imaging information may be reacquired to maximize the confidence of the neural network model 110 for the detection of the first object in the reacquired imaging information. In at least one embodiment, the control circuitry 202 may control the imaging sensor 108 based on the modified set of imaging parameters, to reacquire the imaging information. Control may pass to end.

Various embodiments of the disclosure may provide a non-transitory computer readable medium and/or storage medium having stored thereon, instructions executable by a machine and/or a computer to operate an image-capture apparatus (e.g., the image-capture apparatus 102) for an artificial intelligence (AI) based control of imaging parameters of the image-capture apparatus. The instructions may cause the machine and/or computer to perform operations that include controlling, based on a set of imaging parameters associated with an imaging sensor (e.g., the imaging sensor 108), the imaging sensor to acquire imaging information comprising a first object of the plurality of objects. The operations further include generating, by the neural network model (e.g., the neural network model 110), a first classification result for the first object based on the acquired imaging information. The generated first classification result indicates a confidence of the neural network model for a detection of the first object in the acquired imaging information. The operations further include modifying values of one or more first imaging parameters of the set of imaging parameters based on the generated first classification result and controlling, based on the modified set of imaging parameters, the imaging sensor to reacquire the imaging information to maximize the confidence of the neural network model for the detection of the first object in the reacquired imaging information.

Certain embodiments of the disclosure may be found in an image-capture apparatus and a method for an artificial intelligence (AI) based control of imaging parameters of an image-capture apparatus. Various embodiments of the disclosure may provide the image-capture apparatus 102 (FIG. 1) that may include the memory 204 (FIG. 2), the imaging sensor 108, and the control circuitry 202 (FIG. 2). The memory 204 may be configured to store the neural network model 110 trained to detect a plurality of objects in a field-of-view of the imaging sensor 108. The control circuitry 202 may be further configured to control the imaging sensor 108 to acquire the imaging information that includes a first object of the plurality of objects. The acquired imaging information may include, for example, an uncompressed image frame of the first object or a lossless compressed image frame of the first object.

The imaging sensor 108 may be controlled based on a set of imaging parameters associated with the imaging sensor 108. The set of imaging parameters may include, for example, a focus parameter, an f-stop parameter, an exposure parameter, a shutter speed parameter, an aperture parameter, a gain parameter, a backlight parameter, a brightness parameter, a contrast parameter, a sharpness parameter, a white balance parameter, a sharpness parameter, a ISO sensitivity parameter, a noise reduction parameter, a demosaic parameter, a denoise parameter, a color parameter, a high dynamic range (HDR) parameter, or a deblur parameter.

The control circuitry 202 may be further configured to generate, by the neural network model 110, a first classification result for the first object based on the acquired imaging information. The generated first classification result may indicate a confidence of the neural network model 110 for a detection of the first object in the acquired imaging information. For example, the first classification result may include a probability score that indicates the confidence of the detection of the first object by the neural network model 110.

The control circuitry 202 may be further configured to modify one or more first imaging parameters of the set of imaging parameters based on the generated first classification result and control, based on the modified set of imaging parameters, the imaging sensor 108 to reacquire the imaging information. The imaging information may be reacquired to maximize the confidence of the neural network model 110 for the detection of the first object in the reacquired imaging information.

In at least one embodiment, the control circuitry 202 may be further configured to update the neural network model 110 based on a training of the neural network model 110 on the acquired imaging information. In the training, a set of neural weights of the neural network model 110 may be updated based on an output of the neural network model 110 for the detection of the first object in the acquired imaging information.

In accordance with an embodiment, the control circuitry 202 may be further configured to receive a first user input for a selection of the first object. Based on the received first user input, the control circuitry 202 may be configured to transmit, to a server 104, a request to train the neural network model and receive, from the server 104, the trained neural network model based on the transmitted request.

In accordance with an embodiment, the control circuitry 202 may be further configured to receive a user input for a selection of a file that comprises a set of neural network parameters of the neural network model 110. Based on the selection, the control circuitry 202 may deploy the set of neural network parameters as the neural network model 110 on the image-capture apparatus 102. The set of neural network parameters may include, but are not limited to, at least one a network topology parameter, a set of neural weights, or a loss function.

In accordance with an embodiment, the control circuitry 202 may be further configured to extract, by the neural network model 110, a region-of-interest from the acquired imaging information. The region-of-interest may include the first object. Thereafter, the control circuitry 202 may be further configured to generate, by the neural network model 110, the first classification result for the first object based on the extracted region-of-interest.

In accordance with an embodiment, the control circuitry 202 may be further configured to compare the generated first classification result for the first object with a previous classification result for the first object generated by the neural network model 110. Based on the comparison, the control circuitry 202 may be further configured to modify one or more second imaging parameters of the set of imaging parameters. The one or more second imaging parameters may be different from the one or more first imaging parameters. Specifically, in some cases, the control circuitry 202 may be configured to modify the one or more second imaging parameters based on a determination that the confidence indicated by the generated first classification result is less than that by the previous classification result.

In accordance with an embodiment, the control circuitry 202 may be further configured to generate a first combination of values of imaging parameters for the imaging sensor 108 based on the modified set of imaging parameters. The first combination of values may be generated for the maximization of the confidence of the neural network model 110 for the detection of the first object. The memory 204 may be controlled to store the generated first combination of values of imaging parameters for the first object.

In accordance with an embodiment, the control circuitry 202 may be further configured to receive a second user input for a selection of a second object of the plurality of objects. The control circuitry 202 may be further configured to generate a second combination of values of imaging parameters for the imaging sensor 108 to maximize the confidence of the neural network model 110 for the detection of the second object. The memory 204 may be controlled to store the generated second combination of values of imaging parameters for the second object.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An image-capture apparatus, comprising:
   an imaging sensor;
   a memory configured to store a neural network model which is trained to detect a plurality of objects in a field-of-view (FOV) of the imaging sensor; and
   control circuitry coupled with the imaging sensor and the memory, wherein the control circuitry is configured to:
      control, based on a set of imaging parameters associated with the imaging sensor, the imaging sensor to acquire imaging information comprising a first object of the plurality of objects;
      generate, by the neural network model, a first classification result for the first object based on the acquired imaging information,
         wherein the generated first classification result indicates a confidence of the neural network model for a detection of the first object in the acquired imaging information;
      modify one or more first imaging parameters of the set of imaging parameters based on the generated first classification result; and
      control, based on the modified set of imaging parameters, the imaging sensor to reacquire the imaging information to maximize the confidence of the neural network model for the detection of the first object in the reacquired imaging information.

2. The image-capture apparatus according to claim 1, wherein
   the control circuitry is further configured to update the neural network model based on a training of the neural network model on the acquired imaging information, and
   in the training, a set of neural weights of the neural network model is updated based on an output of the neural network model for the detection of the first object in the acquired imaging information.

3. The image-capture apparatus according to claim 1, wherein the control circuitry is further configured to:
   receive a user input for a selection of a file that comprises a set of neural network parameters of the neural network model; and
   deploy the set of neural network parameters as the neural network model on the image-capture apparatus based on the selection,
      wherein the set of neural network parameters comprises at least one a network topology parameter, a set of neural weights, or a loss function.

4. The image-capture apparatus according to claim 1, wherein the control circuitry is further configured to:
   receive a first user input for a selection of the first object;
   transmit, to a server, a request to train the neural network model based on the received first user input; and
   receive, from the server, the trained neural network model based on the transmitted request.

5. The image-capture apparatus according to claim 1, wherein the set of imaging parameters associated with the imaging sensor comprises at least one of a focus parameter, an f-stop parameter, an exposure parameter, a shutter speed parameter, an aperture parameter, a gain parameter, a backlight parameter, a brightness parameter, a contrast parameter, a sharpness parameter, a white balance parameter, a sharpness parameter, a ISO sensitivity parameter, a noise reduction parameter, a demosaic parameter, a denoise parameter, a color parameter, a high dynamic range (HDR) parameter, or a deblur parameter.

6. The image-capture apparatus according to claim 1, wherein the control circuitry is further configured to:
   extract, by the neural network model, a region-of-interest from the acquired imaging information, wherein the region-of-interest includes the first object; and
   generate, by the neural network model, the first classification result for the first object based on the extracted region-of-interest.

7. The image-capture apparatus according to claim 1, wherein the first classification result comprises a probability score that indicates the confidence of the detection of the first object by the neural network model.

8. The image-capture apparatus according to claim 1, wherein the control circuitry is further configured to:
   compare the generated first classification result for the first object with a previous classification result for the first object generated by the neural network model; and
   modify one or more second imaging parameters of the set of imaging parameters based on the comparison, wherein the one or more second imaging parameters are different from the one or more first imaging parameters.

9. The image-capture apparatus according to claim 8, wherein the control circuitry is configured to modify the one or more second imaging parameters of the set of imaging parameters based on a determination that the confidence indicated by the generated first classification result is less than that by the previous classification result.

10. The image-capture apparatus according to claim 1, wherein the control circuitry is further configured to:
    generate a first combination of values of imaging parameters for the imaging sensor based on the modified set of imaging parameters for the maximization of the confidence of the neural network model for the detection of the first object; and
    control the memory to store the generated first combination of values of imaging parameters for the first object.

11. The image-capture apparatus according to claim 1, wherein the control circuitry is further configured to:
    receive a second user input for a selection of a second object of the plurality of objects; and
    generate a second combination of values of imaging parameters for the imaging sensor to maximize the confidence of the neural network model for the detection of the second object; and
    control the memory to store the generated second combination of values of imaging parameters for the second object.

12. The image-capture apparatus according to claim 1, wherein the acquired imaging information comprises an uncompressed image frame of the first object or a lossless compressed image frame of the first object.

13. A method, comprising:
in an image-capture apparatus which includes an imaging sensor and a memory:
storing, by the memory, a neural network model trained to detect a plurality of objects in a field-of-view (FOV) of the imaging sensor;
controlling, based on a set of imaging parameters associated with the imaging sensor, the imaging sensor to acquire imaging information comprising a first object of the plurality of objects;
generating, by the neural network model, a first classification result for the first object based on the acquired imaging information,
wherein the generated first classification result indicates a confidence of the neural network model for a detection of the first object in the acquired imaging information;
modifying one or more first imaging parameters of the set of imaging parameters based on the generated first classification result; and
controlling, based on the modified set of imaging parameters, the imaging sensor to reacquire the imaging information to maximize the confidence of the neural network model for the detection of the first object in the reacquired imaging information.

14. The method according to claim 13, further comprising updating the neural network model based on a training of the neural network model on the acquired imaging information,
wherein in the training, a set of neural weights of the neural network model is updated based on an output of the neural network model for the detection of the first object in the acquired imaging information.

15. The method according to claim 13,
receiving a user input for a selection of a file that comprises a set of neural network parameters of the neural network model; and
deploying the set of neural network parameters as the neural network model on the image-capture apparatus based on the selection, and
wherein the set of neural network parameters comprises at least one a network topology parameter, a set of neural weights, or a loss function.

16. The method according to claim 13, further comprising:
receiving a first user input for a selection of the first object;
transmitting, to a server, a request to train the neural network model based on the received first user input; and
receiving, from the server, the trained neural network model based on the transmitted request.

17. The method according to claim 13, wherein the set of imaging parameters associated with the imaging sensor comprises at least one of a focus parameter, an exposure parameter, an f-stop parameter, a shutter speed parameter, an aperture parameter, a gain parameter, a backlight parameter, a brightness parameter, a contrast parameter, a sharpness parameter, a white balance parameter, a sharpness parameter, a ISO sensitivity parameter, a noise reduction parameter, a demosaic parameter, a denoise parameter, a color parameter, a high dynamic range (HDR) parameter, or a deblur parameter.

18. The method according to claim 13, wherein the first classification result comprises a probability score that indicates the confidence of the detection of the first object by the neural network model.

19. A non-transitory computer-readable medium having stored thereon, computer-executable instructions that when executed by an image-capture apparatus which includes an imaging sensor and a memory configured to store a neural network model, causes the image-capture apparatus to execute operations, the operations comprising, comprising:
controlling, based on a set of imaging parameters associated with an imaging sensor, the imaging sensor to acquire imaging information comprising a first object of a plurality of objects;
generating, by a neural network model, a first classification result for the first object based on the acquired imaging information,
wherein the generated first classification result indicates a confidence of the neural network model for a detection of the first object in the acquired imaging information;
modifying one or more first imaging parameters of the set of imaging parameters based on the generated first classification result; and
controlling, based on the modified set of imaging parameters, the imaging sensor to reacquire the imaging information to maximize the confidence of the neural network model for the detection of the first object in the reacquired imaging information.

20. The computer-readable medium according to claim 19, wherein the set of imaging parameters associated with the imaging sensor comprises at least one of a focus parameter, an f-stop parameter, an exposure parameter, a shutter speed parameter, an aperture parameter, a gain parameter, a backlight parameter, a brightness parameter, a contrast parameter, a sharpness parameter, a white balance parameter, a sharpness parameter, a ISO sensitivity parameter, a noise reduction parameter, a demosaic parameter, a denoise parameter, a color parameter, a high dynamic range (HDR) parameter, or a deblur parameter.

* * * * *